(12) United States Patent
Kimura et al.

(10) Patent No.: US 6,603,931 B2
(45) Date of Patent: Aug. 5, 2003

(54) PHOTO FILM SUPPORT DEVICE AND MAGNETIC HEAD SECURING METHOD FOR THE SAME

(75) Inventors: Soichiro Kimura, Saitama (JP); Wataru Sasaki, Saitama (JP); Teruo Takahashi, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 71 days.

(21) Appl. No.: 09/861,671

(22) Filed: May 22, 2001

(65) Prior Publication Data

US 2001/0041070 A1 Nov. 15, 2001

Related U.S. Application Data

(62) Division of application No. 09/238,036, filed on Jan. 27, 1999, now Pat. No. 6,266,489.

(30) Foreign Application Priority Data

| Jan. 29, 1998 | (JP) | ............................................. | 10-16699 |
| Feb. 12, 1998 | (JP) | ............................................. | 10-30165 |
| Feb. 13, 1998 | (JP) | ............................................. | 10-31028 |
| Mar. 10, 1998 | (JP) | ............................................. | 10-58336 |

(51) Int. Cl.[7] ............................................. G03B 17/24
(52) U.S. Cl. ...................................... 396/319; 396/440
(58) Field of Search ................................ 396/319, 320, 396/440, 442

(56) References Cited

U.S. PATENT DOCUMENTS

| 4,832,275 | A |   | 5/1989 | Robertson ................... 242/71.1 |
| 4,834,306 | A |   | 5/1989 | Robertson et al. ......... 242/71.1 |
| 5,005,098 | A |   | 4/1991 | Kanada ................... 360/130.34 |
| 5,517,266 | A |   | 5/1996 | Funaki et al. ................ 396/319 |
| 6,064,831 | A |   | 5/2000 | Shimizu ...................... 396/310 |
| 6,072,961 | A |   | 6/2000 | Ozawa et al. ............... 396/310 |
| 6,275,661 | B1 | * | 8/2001 | Tsujimoto ................... 396/319 |

FOREIGN PATENT DOCUMENTS

JP         10-10638        1/1998

* cited by examiner

Primary Examiner—David Gray
(74) Attorney, Agent, or Firm—Sughrue Mion, PLLC

(57) ABSTRACT

A camera incorporates a photo film support plate, which supports a back of photo film. The photo film has a magnetic recording area. An opening is formed in the photo film support plate. A magnetic head projects forwards from inside the opening, for recording information to and/or reading information from the magnetic recording area. A head base plate is mounted on a rear face of the photo film support plate to cover the opening, for supporting the magnetic head. Adhesive agent is applied to the periphery of the head base plate, and hardened for securing the head base plate to the photo film support plate. A pair of recesses are formed in a rear face of the head base plate in a vicinity of the periphery. The adhesive agent is disposed to extend from a front face of the head base plate to a surface of the recesses, which enlarge a contact area between the adhesive agent and the head base plate.

18 Claims, 14 Drawing Sheets

PHOTO FILM SUPPORT DEVICE AND MAGNETIC HEAD SECURING METHOD FOR THE SAME

This is a divisional of application Ser. No. 09/238,036 filed Jan. 27, 1999 now U.S. Pat. No. 6,266,489, the disclosure of which is incorporated herein by reference. The present invention relates to a photo film support device and a magnetic head securing method for the same. More particularly, the present invention relates to a photo film support device and a magnetic head securing method for the same in which a magnetic head can be precisely secured to a the photo film support device with great ease.

BACKGROUND OF THE INVENTION

1. Field of the Invention

2. Description Related to the Prior Art

A known type or photo film has a magnetic recording layer, which consists of a coating applied to a surface reverse to photographic emulsion, and to which information is magnetically recordable. Predetermined photo film information is recorded to the magnetic recording layer, and includes frame numbers, photo film sensitivity, the number of available frames, product name and the like. In taking an exposure, those kinds of information are read and used for conditioning the exposure. Also information of a particular condition determined for each exposure is recorded to the magnetic recording layer.

A camera for use with the photo film having the magnetic recording layer is provided with a magnetic head for the purpose of magnetic recording and reading. The magnetic head is fixedly secured to a photo film support plate, which supports a back surface of the photo film positioned in an exposing station, and keeps the photo film flat. For the magnetic recording and reading with the magnetic recording layer in an exact manner, it is essential to stabilize pressure in contact of the magnetic head with the magnetic recording layer.

FIG. 18 is now referred to, and the magnetic head and its relevant structure in the camera are described. The camera has an exposure aperture which defines a region to be exposed on photo film 211. There is a photo film support plate 213 or pressure plate disposed behind the exposure aperture. The photo film support plate 213 supports the photo film 211 in contact with a back surface of the photo film 211 positioned on the exposure aperture, to keep an imaging frame flat. A magnetic recording layer is formed by applying a coating of magnetic material to the back surface of the photo film 211, which is opposed to the photo film support plate 213. A magnetic head 215 is secured to the photo film support plate 213, and contacts the magnetic recording layer of the photo film 211 to record information to and/or read information from a magnetic recording area.

In FIG. 18, the magnetic head 215 is positioned to protrude forward from a head base plate 216. The photo film support plate 213 has an opening 217 through which the magnetic head 215 is disposed. The head base plate 216 is kept so positioned that the magnetic head 215 projects from the opening 217 at a predetermined projecting amount A experimentally obtained for the magnetic head 215 to give suitable pressure to the magnetic recording layer of the photo film 211. When the head base plate 216 is positioned, adhesive agent 218 is applied to the head base plate 216 and the photo film support plate 213 to extend from the rear face of the head base plate 216 to the rear face of the photo film support plate 213. The adhesive agent 218 is hardened and forms an adhesive layer in a certain spread area, to secure the head base plate 216 fixedly to the photo film support plate 213. There are plural positions on the periphery of the head base plate 216 where the adhesive agent 218 is applied.

To pour the adhesive agent 218, the head base plate 216 and the photo film support plate 213 are kept positioned with their rear directed upwards. The adhesive agent 218 is applied to overlapped portions between the head base plate 216 and the photo film support plate 213. An example of the adhesive agent 218 is an ultraviolet cure type which has a characteristic which is ordinarily fluid and hardened in response to application of ultraviolet rays.

There is a problem in the method of pouring the adhesive agent 218 on the rear faces of the photo film support plate 213 and the head base plate 216, in that the adhesive agent 218 flows to change an area where the adhesive agent 218 spreads. As the head base plate 216 itself has a relatively small area of the surface, the adhesive agent 218 comes to have an appearance giving a poor impression, because plural layers of the adhesive agent 218 overlap on one another when the adhesive agent 218 is spread on the rear of the head base plate 216. Furthermore, the spread area of the adhesive agent 218 is likely to be larger than is sufficient. The used amount of the adhesive agent 218 is wastefully large. An amount of the adhesive agent 218 to be poured for one time may be predetermined to avoid the excessive use of the adhesive agent 218. However another problem occurs in that the adhesive agent 218 is poured in an unacceptable position offset to the photo film support plate 213. A spread area defined by the adhesive agent 218 on the head base plate 216 may become extremely small, to lower the strength of fixing the head base plate 216 to the photo film support plate 213.

SUMMARY OF THE INVENTION

In view of the foregoing problems, an object of the present invention is to provide a photo film support device and a magnetic head securing method for the same in which a magnetic head can be reliably secured to the photo film support device with great ease.

Another object of the present invention is to provide a photo film support device and a magnetic head securing method for the same in which adhesive agent is prevented from overflowing rearwards from a head base plate.

An additional object of the present invention is to provide a photo film support device and a magnetic head securing method for the same in which an assembly machine for those can be simply constructed without extremely difficult adjustment.

Still another object of the present invention is to provide a photo film support device which consists of a plate of metal and which can be produced with great efficiency.

In order to achieve the above and other objects and advantages of this invention, a photo film support device is incorporated in a camera, for supporting a back of photo film, the photo film having a magnetic recording area. The photo film support device includes a photo film support plate. An opening is formed in the photo film support plate. A magnetic head is disposed to project forwards from inside the opening, for recording information to and/or reading information from the magnetic recording area. A head base plate is mounted on a rear face of the photo film support plate to cover the opening, for supporting the magnetic head. Adhesive agent is applied to at least one portion of the periphery of the head base plate, and hardened for securing the head base plate to the photo film support plate. At least one recess or at least one projection is disposed on a periphery of the head base plate and/or on a rear face of the head base plate in a vicinity of the periphery, the adhesive agent being disposed to extend from a front face of the head base plate to a surface of the recess or the projection, the recess or the projection enlarging a contact area between the adhesive agent and the head base plate.

In a preferred embodiment, the at least one portion of the periphery of the head base plate includes first and second edges opposite to each other, and the at least one recess or the at least one projection is located on the first and second edges.

The at least one recess is first and second recesses, formed in the head base plate by cutting a rear end of the first and second edges.

The head base plate further has first and second projection trains, respectively including plural projections, disposed on an inside of the first and second recesses to project toward the periphery.

In another preferred embodiment, the at least one projection is first and second projection trains, respectively including plural projections, disposed on the first and second edges to project from the head base plate in a peripheral direction.

By this construction, the magnetic head can be reliably secured to the photo film support device with great ease, because of the contact area enlarged by the recess or the projection between the adhesive agent and the head base plate.

According to another aspect of the present invention, adhesive agent is applied to at least one adhesion section disposed on a periphery of the head base plate, and hardened for securing the head base plate to the photo film support plate. An anti-overflow structure is disposed to project rearwards from the photo film support plate, positioned outside the at least one adhesion section, for blocking the adhesive agent, to prevent the adhesive agent from overflowing about the head base plate.

In a preferred embodiment, the anti-overflow structure includes an anti-overflow plate. A first cutout is formed in the anti-overflow plate, substantially rectangular, and disposed about the head base plate.

Furthermore, a double-sided adhesive sheet attaches the anti-overflow plate to the photo film support plate. A second cutout is formed in the double-sided adhesive sheet, substantially rectangular, and overlaid on the first cutout.

By this construction, the adhesive agent is prevented from overflowing rearwards from the head base plate, as the anti-overflow structure projects rearwards for blocking the adhesive agent.

According to an additional aspect of the present invention, at least first and second head support projections are disposed in at least first and second positions defined in the opening opposite to each other, the first and second head support projections projecting from the opening rearwards by a predetermined height. A head base plate is mounted on a rear face of the photo film support plate, contacted by the first and second head support projections to cover the opening, for supporting the magnetic head. At least one spacer is mounted between the photo film support plate and the photo film support plate and outside the first and second head support projections before the head base plate is mounted on the photo film support plate, the spacer having a predetermined thickness smaller than the predetermined height. Adhesive agent is poured and hardened between the head base plate and the spacer.

In a preferred embodiment, the photo film support plate is a metal plate, initially first and second projecting portions are formed in the first and second positions of the opening, then the first and second projecting portions are bent rearwards, the first and second projecting portions having a predetermined initial height as measured in a rearward direction, and the predetermined initial height being greater than the predetermined height, and then the first and second projecting portions are depressed in a forward direction to form the first and second head support projections at the predetermined height.

By this construction, an assembly machine for those can be simply constructed without extremely difficult adjustment, as the head base plate contacted by the first and second head support projections, and can be precisely positioned on the photo film support plate readily without difficulties.

According to still another aspect of the present invention, a photo film support plate of metal is produced by press. At least two metal pins of a cylindrical shape is formed integrally with the photo film support plate to project forwards therefrom, the metal pins being produced in producing the photo film support plate by subjecting a top end and a bottom end of the photo film support plate to drawing press, and the metal pins regulating respective longitudinally extending edges of the photo film therebetween.

Furthermore, circular recesses are formed behind the metal pins simultaneously therewith by the drawing press deforming the top end and the bottom end of the photo film support plate. The metal pins have a diameter substantially equal to a thickness of the photo film support plate.

By this construction, a photo film support device can be produced with great efficiency, because the metal pins can be produced with the photo film support plate only at one time.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
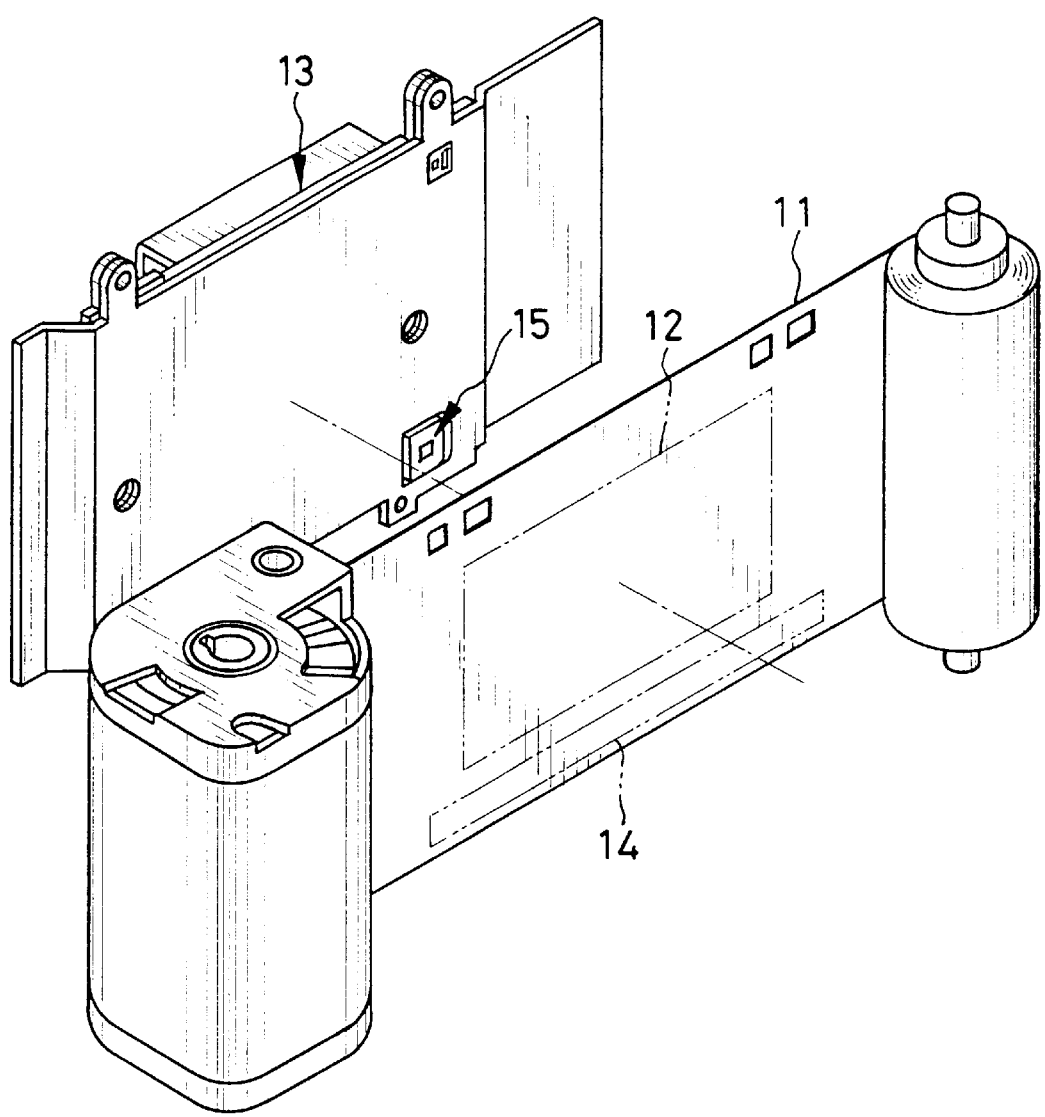
FIG. 1 is an exploded perspective illustrating a photo film support device and photo film positioned inside a camera.

In FIG. 1, a structure inside a camera and relevant to a magnetic head is illustrated. The camera has an exposure aperture 12 which defines a region to be exposed on photo film 11. There is a photo film support plate 13 or pressure plate disposed behind the exposure aperture 12. The photo film support plate 13 supports the photo film 11 in contact with a back surface of the photo film 11 positioned on the exposure aperture 12, to keep an imaging frame flat. A magnetic recording layer is formed by applying a coating of magnetic material to the back surface of the photo film 11, which is opposed to the photo film support plate 13. A magnetic head 15 is secured to the photo film support plate 13, and contacts the magnetic recording layer of the photo film 11 to record information to and/or read information from a magnetic recording area 14.

Figure 2:
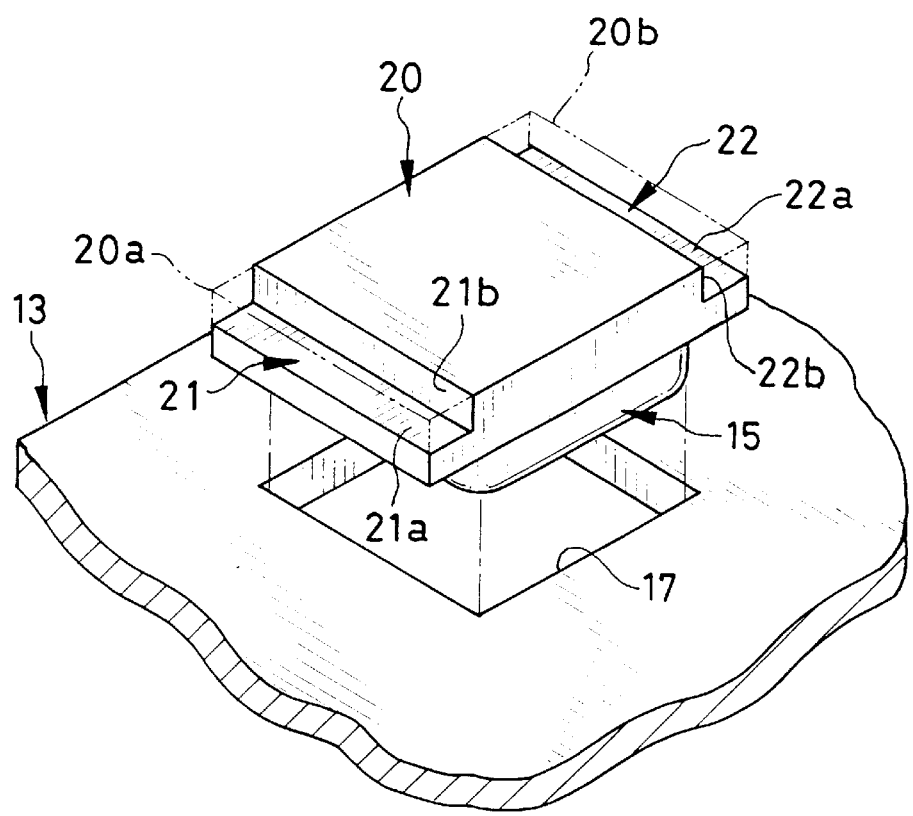
FIG. 2 is an explanatory view in perspective, illustrating a magnetic head, a head base plate and a photo film support plate.
Figure 3:
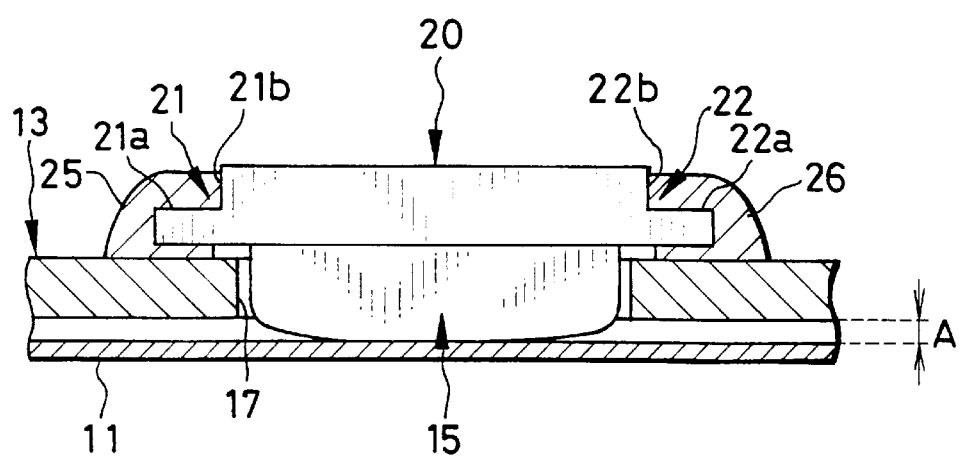
FIG. 3 is a cross section illustrating a secured state of the magnetic head to the photo film support plate.

In FIGS. 2 and 3, the magnetic head 15 is positioned to protrude from a front face of a head base plate 20. An opening 17 is formed in the photo film support plate 13.

The head base plate 20 has first and second edges 20a and 20b, which are opposite to one another. Recesses 21 and 22 or adhesion sections in a stepped shape are formed by cutting portions of the edges 20a and 20b in such a manner that each of the recesses 21 and 22 has two inner faces, one directed to the rear and the other directed to the periphery. Adhesive agent 25 and 26 is applied to the recesses 21 and 22 to extend from the rear of the head base plate 20 to its front, and hardened to form adhesive layers. Thus the head base plate 20 with the magnetic head 15 is fixedly secured to the photo film support plate 13. It is noted that the adhesive agent 25 and 26 is an ultraviolet cure type which has a characteristic which is ordinarily fluid and hardened in response to application of ultraviolet rays.

To secure the magnetic head 15 to the photo film support plate 13, the photo film support plate 13 is positioned and oriented in an initial state with its rear face directed upwards. Then the magnetic head 15 fixed on the front face of the head base plate 20 is fitted in the opening 17 through the rear of the photo film support plate 13. The head base plate 20 is so positioned that the magnetic head 15 projects from the front of the opening 17 at a predetermined projecting amount A, which causes the magnetic head 15 to press the magnetic recording area 14 on the photo film 11 with an acceptable pressure.

When the head base plate 20 is positioned, the adhesive agent is applied to the recesses 21 and 22 by extension from recess faces 21a and 22a to the rear face of the photo film support plate 13, the recess faces 21a and 22a being directed to the rear. Thus the attachment of the head base plate 20 to the photo film support plate 13 is kept firm.

The flow of the adhesive agent coated on the rear of the head base plate 20 is blocked by recess faces 21b and 22b, which are included in the recesses 21 and 22. Therefore the adhesive agent is prevented from spreading in the rear of the head base plate 20. This is effective in avoiding excessive use of the adhesive agent, because areas of the adhesive agent 25 and 26 do not become larger than predetermined. The adhesive agent 25 and 26 is spread to extend to the recess faces 21a and 22a and to the recess faces 21b and 22b of the recesses 21 and 22, so that the areas of adhesion of the adhesive agent 25 and 26 are enlarged. Thus force of the adhesion between the head base plate 20 and the photo film support plate 13 is maintained without being lowered, in a manner consistent with the reduction of the adhesive agent.

Figure 4:
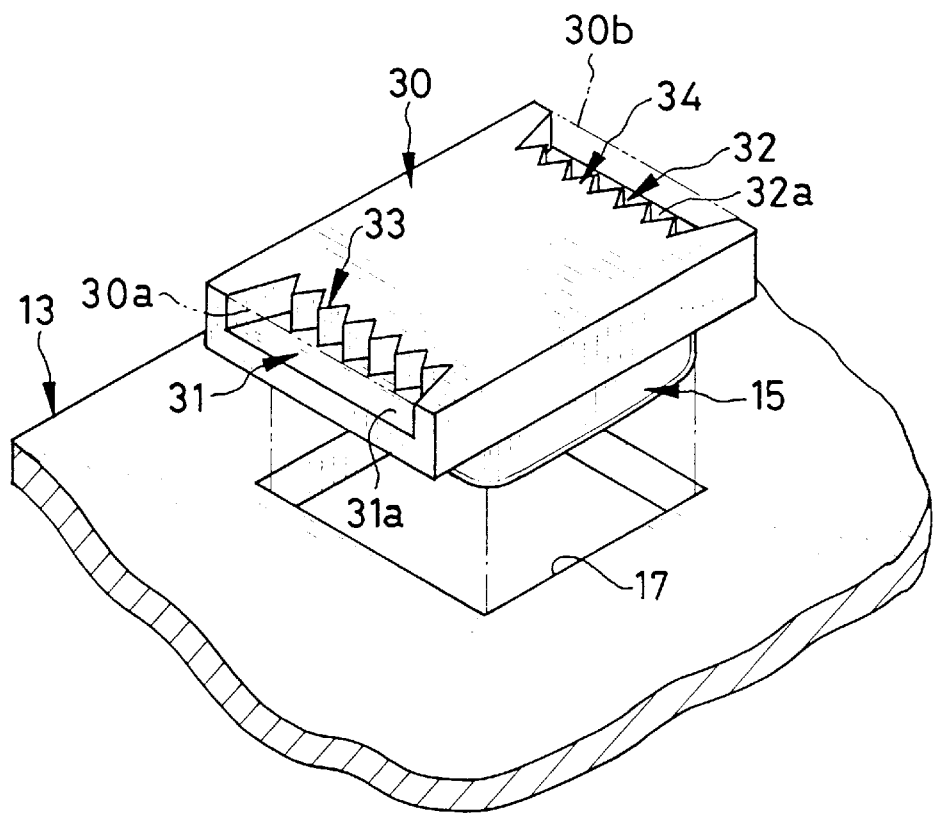
FIG. 4 is an explanatory view in perspective, illustrating another preferred head base plate with the magnetic head and the photo film support plate.
Figure 5:
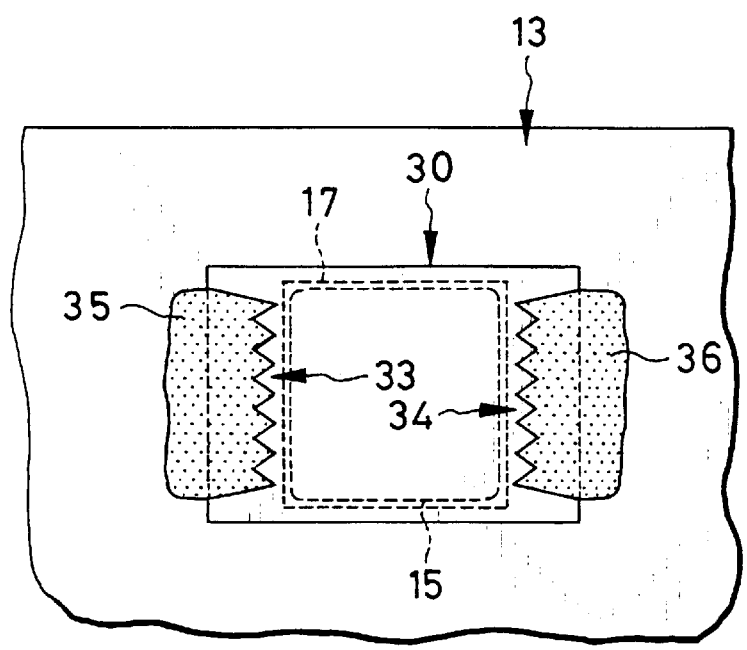
FIG. 5 is a plan illustrating a secured state of the magnetic head.

In FIGS. 4 and 5, another preferred structure for securing the magnetic head is depicted. A head base plate 30 has first and second edges 30a and 30b, which are opposite to one another. Recesses 31 and 32 or adhesion sections in a stepped shape are formed by cutting portions of the edges 30a and 30b in such a manner that each of the recesses 31 and 32 has two inner faces, rear and peripheral. Trains of projections 33 and 34 or teeth are protruded from rearwards erected faces of the recesses 31 and 32. Adhesive agent 35 and 36 is applied to the recesses 31 and 32 to extend from recess faces 31a and 32a of the recesses 31 and 32 to the rear face of the photo film support plate 13, and hardened. Thus the head base plate 30 with the magnetic head 15 is fixedly secured to the photo film support plate 13. In the present embodiment, the adhesive agent 35 and 36 deeply enters the bottoms between the projection trains 33 and 34 to attach the head base plate 30 in an enlarged area of the adhesion. The attachment between the head base plate 30 and the photo film support plate 13 can be firmer.

Figure 6:
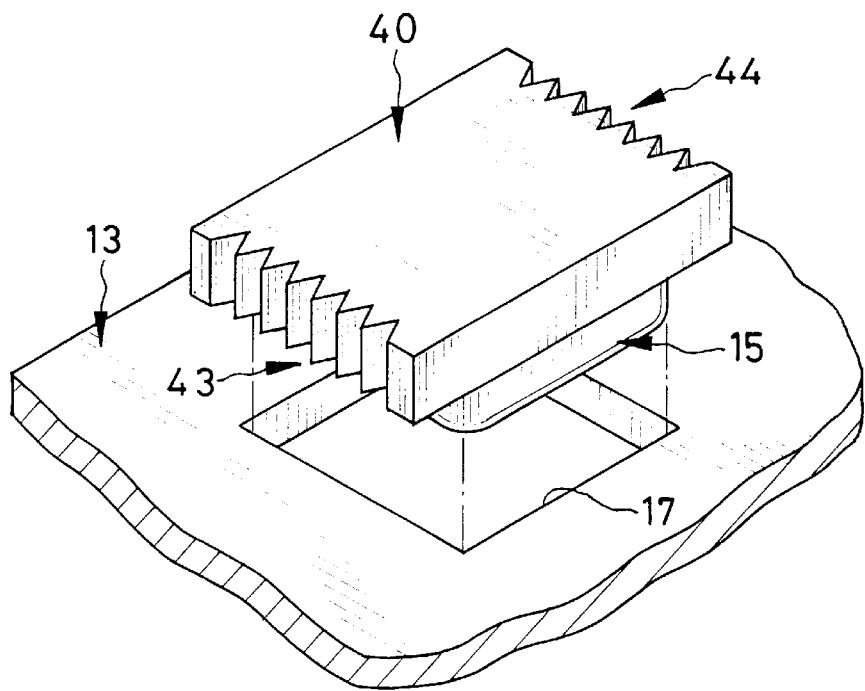
FIG. 6 is an explanatory view in perspective, illustrating still another preferred head base plate with the magnetic head and the photo film support plate.
Figure 7:
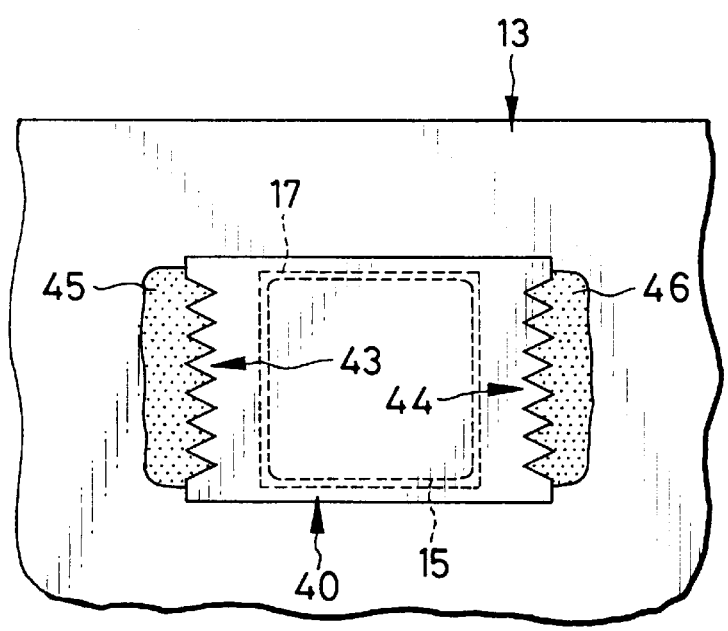
FIG. 7 is a plan illustrating a secured state of the magnetic head.

In FIGS. 6 and 7, still another preferred structure for securing the magnetic head is depicted. A head base plate 40 has two trains of projections 43 and 44 or teeth of adhesion sections, arranged along opposite edges of the head base plate 40. When the head base plate 40 is positioned with the magnetic head 15 kept protruded from the opening 17, adhesive agent 45 and 46 is applied to overlie on the projection trains 43 and 44 and their associated rear portions of the photo film support plate 13. The adhesive agent 45 and 46 is then hardened, to fix the head base plate 40 on the photo film support plate 13 with the magnetic head 15. In the present embodiment, the adhesive agent 45 and 46 is spread on peripheral portions of the head base plate 40, but not on the rear face of the head base plate 40. Note that, although the adhesive agent 45 and 46 does not extend to the rear face of the head base plate 40, the adhesion between the head base plate 40 and the photo film support plate 13 is maintained without being weak, because bottoms between projections of the projection trains 43 and 44 receive entry of the adhesive agent, and enlarge an area of the adhesion. The projection trains 43 and 44 are directly formed with the periphery of the head base plate 40. It is easier to manufacture the head base plate 40 of the present embodiment than the head base plate 30 according to the embodiment of FIGS. 4 and 5.

In the above embodiments, the adhesive agent is applied to the two edges of the head base plate. But the adhesive agent may be applied to three or four edges of the head base plate. Of course all the three or four edges must be provided with the structure for avoiding spreading of the adhesive agent, either the stepped shape or projection trains.

In the embodiments of FIGS. 2–5, the recess faces 21b and 22b are erect faces of the head base plate 20, 30. Alternatively a variant head base plate can have two ridges formed therewith, and the recess faces 21b and 22b can be disposed on the ridges. Such a head base plate can have a reduced thickness in comparison with the head base plate 20, 30. Furthermore it is possible to form a train of holes or at least one groove along each of the two edges of the head base plate instead of the projection trains 33 and 34 and the projection trains 43 and 44 described above. In the above embodiments, the adhesive agent is applied to extend along the two edges. But the adhesive agent may be applied only to portions of the plural edges, for example to two or more points located on the plural edges.

Figure 8:
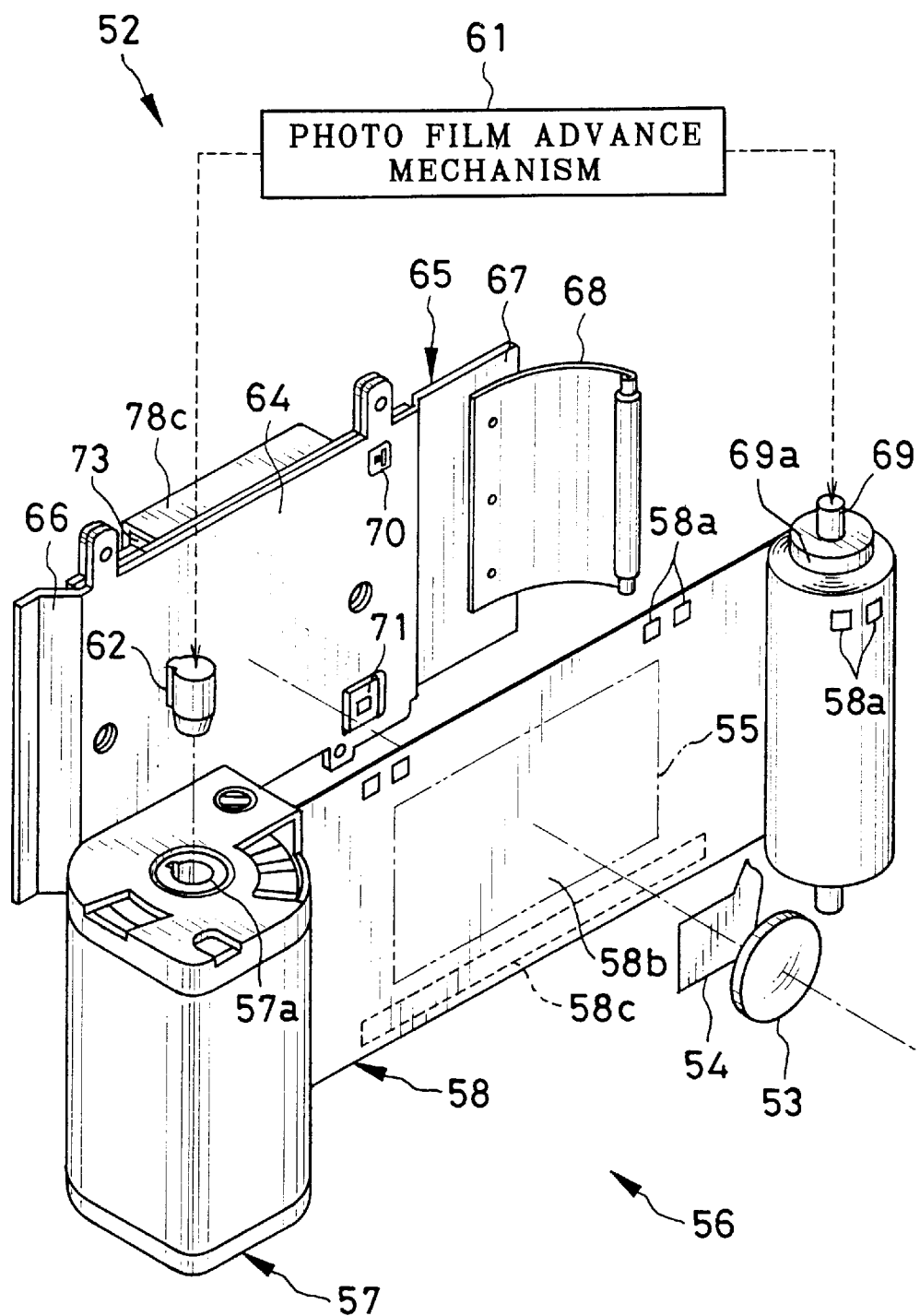
FIG. 8 is an exploded perspective illustrating another preferred photo film support device and the photo film positioned inside a camera.

Referring now to FIGS. 8–10B, a preferred embodiment is described now, in which the adhesive agent is prevented from overflowing rearwards from a head base plate. In FIG. 8, a camera 52 has a taking lens 53, a shutter blade 54 and an exposure aperture 55, which is located between a cassette holder chamber and a photo film roll chamber.

A photo film cassette 56 consists of a cassette shell 57 and photo film 58. The cassette shell 57 is made from resin, and contains a spool 57a in a rotatable manner. The photo film 58 has a magnetic recording layer formed on its back surface, and includes a train of perforations 58a. There are two intervals between the perforations 58a, shorter and longer, which are alternately repeated in the train. Before the photo film 58 is used, the entirety of the photo film 58 is contained in the cassette shell 57. When the spool 57a is rotated in an unwinding direction, the leader of the photo film 58 is advanced to the outside of the cassette shell 57. Details of this structure are disclosed in U.S. Pat. Nos. 4,832,275 and 4,834,306.

When the photo film cassette 56 is inserted in the cassette holder chamber, a photo film advance mechanism 61 including a motor, gear trains and the like causes a drive shaft 62 to rotate. The drive shaft 62 being engaged with the spool 57a, the spool 57a is rotated in the unwinding direction, so that the leader of the photo film 58 is advanced to the outside of the cassette shell 57.

A photo film support plate 65 or pressure plate is disposed between the cassette holder chamber and the photo film roll chamber. An edge 66 of the photo film support plate 65 on the side of the cassette holder chamber is inclined in a rearward direction. The leader of the photo film 58 exited from the cassette shell 57 contacts the edge 66, is guided to a front face 64 of the photo film support plate 65, and is moved to the photo film roll chamber while the back surface of the photo film 58 is supported on the photo film support plate 65.

An edge 67 of the photo film support plate 65 on the side of the photo film roll chamber is provided with a photo film guide plate 68 fixed thereto by screws. A take-up spool 69 in the photo film roll chamber is caused by the photo film advance mechanism 61 to rotate in the winding direction at the same time as the drive shaft 62. The photo film guide plate 68 presses the leader of the photo film 58 against a spool surface 69a of the take-up spool 69, and causes the take-up spool 69 to wind the photo film 58. As the edge 67 of the photo film support plate 65 has the level stepped in the rearward direction, the photo film 58 is not blocked by the screws of the photo film guide plate 68 while the photo film 58 is advanced.

There are a perforation sensor 70 and a magnetic head 71 assembled with the photo film support plate 65. The perforation sensor 70 is an optical detector of a type constituted by a beam projector and a beam receiver. When the perforation sensor 70 detects the perforation 58a of a first of the frames of the photo film 58, then the photo film advance mechanism 61 stops rotating the drive shaft 62 and the takeup spool 69 to set the first frame on the exposure aperture 55.

A liquid crystal display (LCD) panel 73 is incorporated in the rear of the photo film support plate 65, and displays information externally in the rear of the camera 52, the information including a printing region, a date and the like. A user visually checks the LCD panel 73, inputs information to the camera 52, and then depresses a shutter release button to take an exposure. In response to the button depression, the shutter blade 54 is actuated to expose a first imaging frame 58b in the photo film 58.

When the first frame is exposed, the drive shaft 62 and the take-up spool 69 are rotated again to wind the photo film 58 into the cassette shell 57. When the perforation sensor 70 detects the perforation 58a of a second of the frames of the photo film 58, the drive shaft 62 and the take-up spool 69 are stopped to set the second frame on the exposure aperture 55.

In the course of the one-frame advance, the magnetic head 71 records magnetic data of the photographic information to a magnetic recording area 58c, which is disposed under the imaging frame 58b. As the photo film 58 is kept flat by the front face 64, it is possible for the perforation sensor 70 to detect the perforations 58a and for the magnetic head 71 to record the magnetic data.

When all the frames are exposed on the photo film 58, then the photo film advance mechanism 61 causes the drive shaft 62 and the take-up spool 69 to rotate, to wind all the photo film 58 into the cassette shell 57. The photo film cassette 56 is removed from the camera 52, forwarded to a photo laboratory, and processed. In the course of photographic printing, the magnetic data is read from the photo film 58. Photographic prints are produced in accordance with the photographic information.

Figure 9:
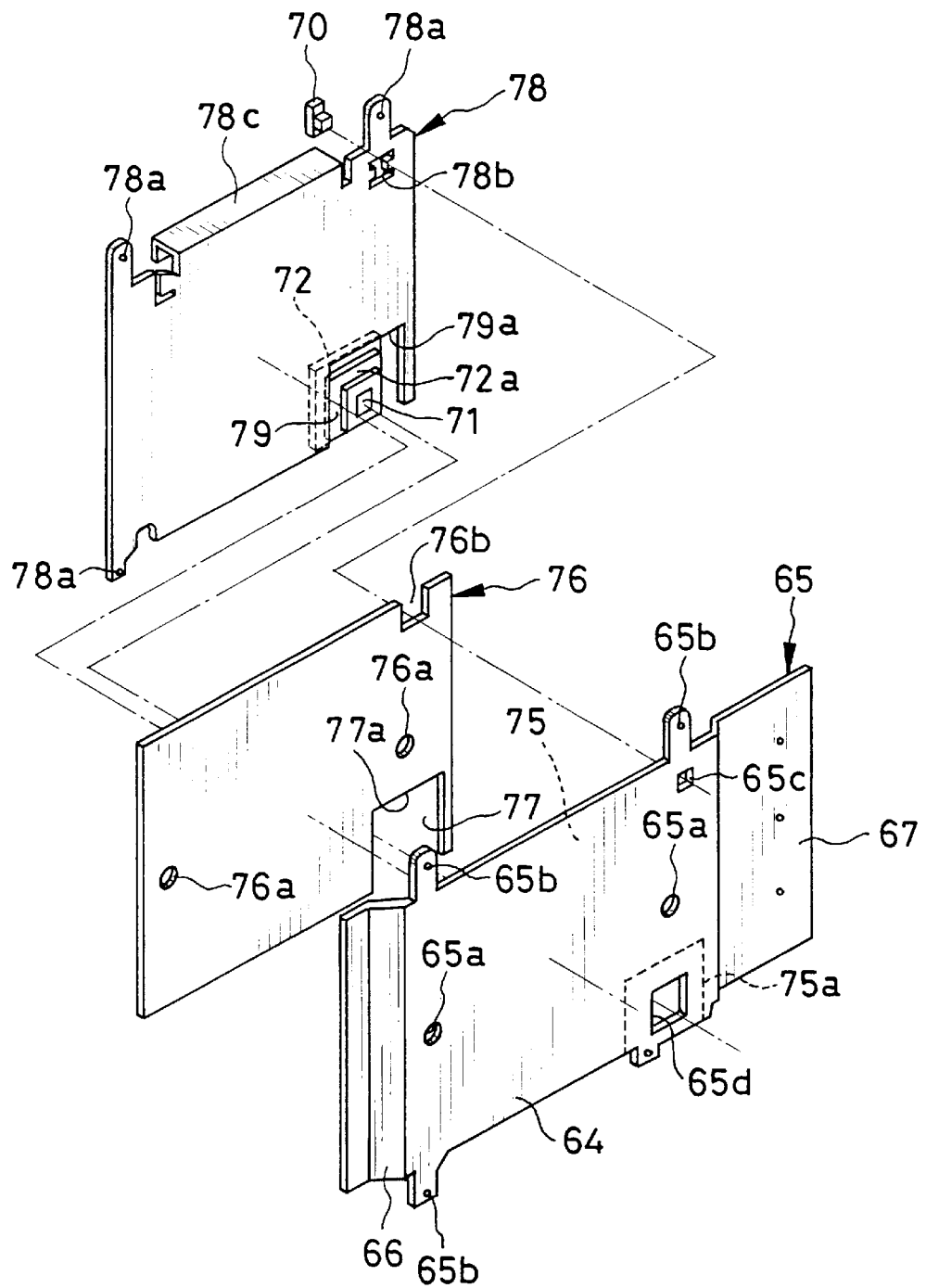
FIG. 9 is an exploded perspective illustrating the photo film support device.

In FIG. 9, the photo film support plate 65 has two positioning holes 65a, including a first disposed in the right at the middle height, and a second disposed in the left at the middle height. Also the photo film support plate 65 has three fixing holes 65b, including a first disposed in an arm extended from the right top, a second disposed in an arm extended from the left top, and a third disposed in an arm extended from the left bottom. A hole 65c is formed in the photo film support plate 65 for passage of detection light adapted to detection of perforations. An opening 65d is formed in the bottom of the photo film support plate 65 for assembly of the magnetic head 71.

The magnetic head 71 is disposed on a head base plate 72 in a projecting manner from edges 72a as adhesion sections. A rear face 75 of the photo film support plate 65 has an adhesion surface 75a, which is about the opening 65d, and to which adhesive agent 74 (See FIG. 10A) is poured for attachment of the head base plate 72. The photo film support plate 65 has a thickness of approximately 0.5 mm.

A double-sided adhesive sheet 76 constitutes an antioverflow structure for preventing the adhesive agent 74 in the adhesion surface 75a from overflowing. Positioning holes 76a are formed in the double-sided adhesive sheet 76, and respectively correspond to the positioning holes 65a. A hole 76b is formed in the double-sided adhesive sheet 76 for passage of the detection light. A cutout 77 is formed for the assembly of the magnetic head 71. The double-sided adhesive sheet 76 has a thickness of approximately 0.1 mm.

An anti-overflow plate 78 of the anti-overflow structure has three fixing holes 78a, including a first disposed in an arm extended from the right top, a second disposed in an arm extended from the left top, and a third disposed in an arm extended from the left bottom. The fixing holes 78a are respectively located behind the fixing holes 65b. The anti-overflow plate 78 has a cutout 78b for receiving the perforation sensor 70, and a cutout 79 for receiving the magnetic head 71. A bend portion 78c is formed with a top of the anti-overflow plate 78, and has a shape rectangularly bent toward the rear with a resilient characteristic. The LCD panel 73 is held in the bend portion 78c. The anti-overflow plate 78 is formed from metal and has a thickness of approximately 0.15 mm.

The centers of the cutout 77 in the double-sided adhesive sheet 76 and the cutout 79 in the anti-overflow plate 78 are set equal to the center of the opening 65d. The cutouts 77 and 79 have a size equal to that of the adhesion surface 75a, and are open to the bottom.

A process of attaching the anti-overflow plate 78 to the rear face 75 with the double-sided adhesive sheet 76 is described now. At first the double-sided adhesive sheet 76 is positioned on the photo film support plate 65 by setting the center of the positioning holes 65a at the center of the positioning holes 76a. The front face of the double-sided adhesive sheet 76 is attached to the rear face 75.

Then the anti-overflow plate 78 is so positioned on the photo film support plate 65 as to set the center of the fixing holes 78a at that of the fixing holes 65b. The anti-over-flow plate 78 is adhesively attached to the rear of the double-sided adhesive sheet 76, to fix the anti-overflow plate 78 finally. After this, the photo film guide plate 68 is secured to the edge 67 of the photo film support plate 65 by screws. The photo film support plate 65 is secured to the camera body by use of screws through the fixing holes 65b and the positioning holes 76a.

After the double-sided adhesive sheet 76 and the anti-overflow plate 78 are attached to the rear face 75, the adhesion surface 75a is located within inside edges 77a and 79a of the cutouts 77 and 79. The inside edges 77a and 79a constitute an anti-overflow wall 80, which avoids overflow of the adhesive agent 74 in the adhesion surface 75a. The anti-overflow wall 80 defines a height or depth with reference to the adhesion surface 75a according to the thicknesses of the double-sided adhesive sheet 76 and the anti-overflow plate 78.

Figure 10A:
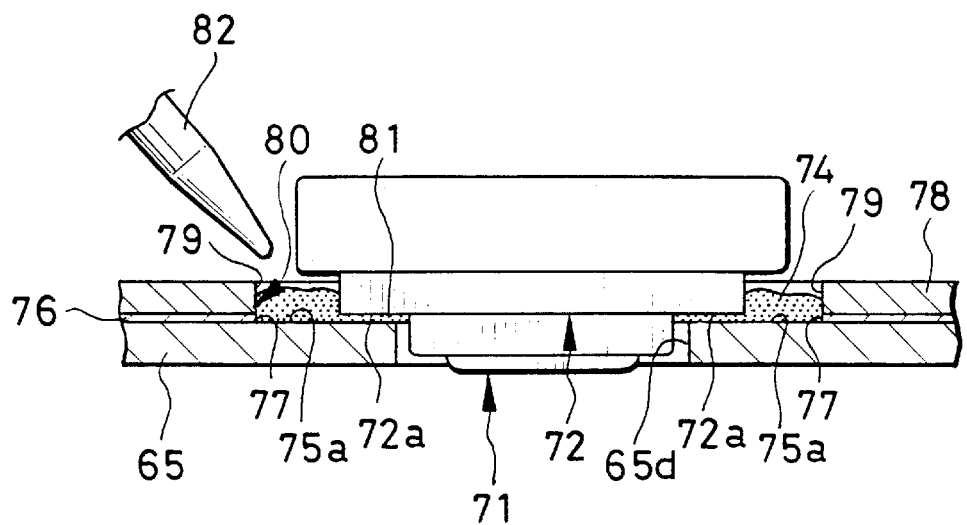
FIG. 10A is a cross section illustrating a secured state of the magnetic head.

The assembly of the magnetic head 71 is described with reference to FIG. 10A. At first the magnetic head 71 is inserted into the opening 65d until the magnetic head 71 protrudes forwards from the front face 64. The edges 72a of the head base plate 72 are opposed to the adhesion surface 75a. A gap 81 of a small thickness is kept formed between the edges 72a and the adhesion surface 75a.

Then an adhesive pouring nozzle 82 is moved to the vicinity of the adhesion surface 75a, and pours the adhesive agent 74 of the ultraviolet cure type to the adhesion surface 75a by a predetermined amount. The adhesive agent 74 is spread to the periphery of the magnetic head 71, is introduced into the gap 81, and fixes the head base plate 72. The periphery of the adhesion surface 75a is surrounded by the anti-overflow wall 80 except for the bottom. The adhesive agent 74 is prevented by the anti-overflow wall 80 from overflowing outside the adhesion surface 75a.

Thus the adhesive agent is prevented from overflowing by the anti-overflow plate 78. The perforation sensor 70 and the LCD panel 73 can be safely positioned in the cutout 78b and the bend portion 78c. Note that the surplus of the adhesive agent flows down away from the lower edges of the adhesion surface 75a. Thus the surplus does not overflow from the anti-overflow wall 80. This construction makes it easy to control a flow amount of the adhesive agent 74.

It is to be noted that the double-sided adhesive sheet 76 is an insulator to protect the LCD panel 73 and other elements from being influenced by static charge created by friction between the back surface of the photo film 58 and the front face 64 in the course of the photo film advance. Furthermore the order of assembly of the anti-overflow plate 78 and the double-sided adhesive sheet 76 may be changed. At first the anti-overflow plate 78 is positioned on the double-sided adhesive sheet 76, and attached to its rear. Thereafter the photo film support plate 65 is positioned on the anti-overflow plate 78, to attach the rear face 75 to the front of the double-sided adhesive sheet 76.

Figure 10B:
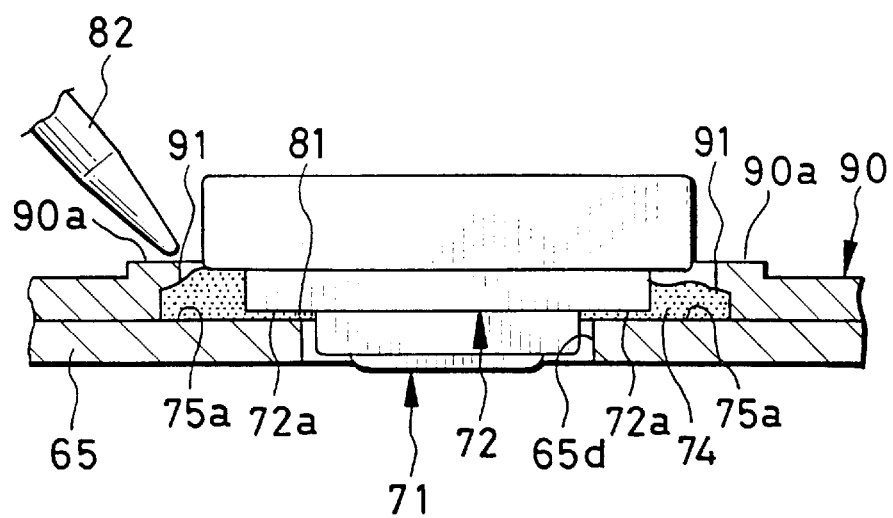
FIG. 10B is a cross section illustrating a secured state of the magnetic head in another preferred photo film support device.

In FIG. 10B, another preferred embodiment is depicted. Elements similar to those of FIGS. 8, 9 and 10A are designated with identical reference numerals. An anti-overflow plate 90 of an anti-overflow structure has almost the same shape as the anti-overflow plate 78, and is overlaid on the rear face 75 of the pressure plate. A projecting portion 90a is formed to project rearwards from the anti-overflow plate 90 to lie about the adhesion surface 75a. The projecting portion 90a avoids overflow of the adhesive agent 74 in the adhesion surface 75a.

It is possible for the adhesive agent 74 spread at the projecting portion 90a to make attachment firm between the anti-overflow plate 90 and the adhesion surface 75a in addition to the fixation of the head base plate 72. A manufacturing process of the photo film support device can be simplified. A ridge 91 is preferably formed with the projecting portion 90a in a position over the adhesion surface 75a for enlarging an area coated by the adhesive agent 74. It is possible to increase strength of adhesion of the anti-overflow plate 90.

Note that a coating of insulating agent may be applied to the entire surface of the anti-overflow plate for the purpose of eliminating influence of static charge. Also an insulating sheet may be attached to the rear face of the anti-overflow plate. The anti-overflow plate itself may be formed from resin. Also in the course of the attachment, the surface of the edges 72a of the head base plate may be tightly contacted by the adhesion surface 75a, before the adhesive agent is poured to the adhesion surface 75a for the attachment.

The shapes of the double-sided adhesive sheet 76 and the anti-overflow plate 78, 90 may be different from those described above, and for example, may have a circular hole instead of the cutouts 77 and 79 which are rectangular. The adhesion surface 75a may be surrounded by the anti-overflow wall 80 or a step of the hole. Also the anti-overflow plate 78, 90 may have a smaller size than the double-sided adhesive sheet 76. Then the plate does not have the anti-overflow operation but operates to support the LCD panel 73 and the perforation sensor 70 while the double-sided adhesive sheet 76 has the anti-overflow operation. The use of only the double-sided adhesive sheet 76 for anti-overflow operation without the anti-overflow plate 78, 90 is still effective for avoiding overflow of the adhesive agent. Furthermore the LCD panel 73 and/or the flexible circuit board may be directly secured to the double-sided adhesive sheet 76.

Figure 11:
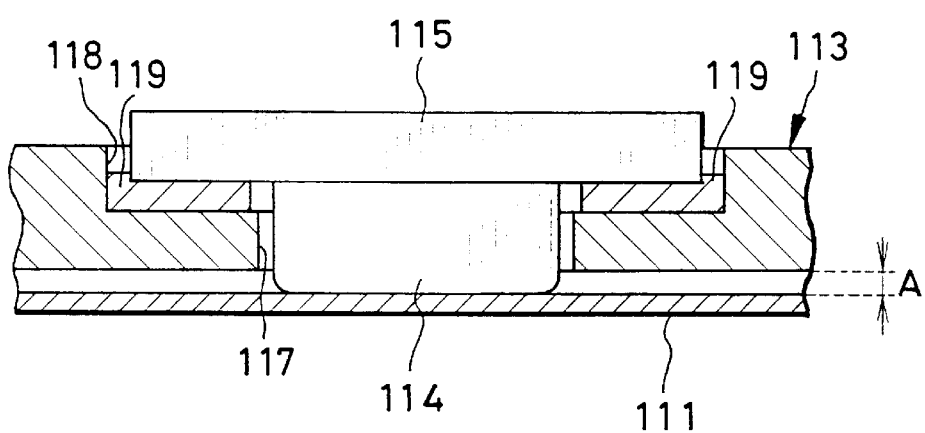
FIG. 11 is a cross section illustrating a comparative example of photo film support plate with a magnetic head.

Another preferred method of securing a magnetic head, according to which the magnetic head can be easily and exactly secured, is described now. In FIG. 11, a comparative example of a photo film support plate 113 or pressure plate is illustrated. The photo film support plate 113 has an opening 117. A cutout 118 of an anti-overflow structure is formed on the edge of the opening 117, and supports a head base plate 115.

To secure a magnetic head 114 to the photo film support plate 113, the magnetic head 114 on the head base plate 115 is inserted into the opening 117 through the back of the photo film support plate 113. The magnetic head 114 is held by keeping the head base plate 115 slightly away from the inside of the cutout 118 so as to keep the magnetic head 114 protruded from the opening 117 at a predetermined projecting amount A. Then adhesive agent 119 is introduced to the gap between the head base plate 115 and the cutout 118 to fix the magnetic head 114 to the photo film support plate 113. Note that the projecting amount A is set in consideration of suitable pressure applied by the magnetic head 114 to the magnetic recording layer of photo film 111. Since the projecting amount A is as small as a number of microns, extremely high precision is required for positioning the magnetic head 114.

However there are excessive errors in the method in which the projecting amount of the magnetic head 114 from the opening 117 is adjusted while the magnetic head 114 is moved in a three-dimensional space. Difficulties are extreme in maintaining precision in positioning the magnetic head 114. As the magnetic head 114 must be shifted by one micron or a small number of microns, high performance is required for an assembly machine for the magnetic head 114, to raise the manufacturing cost. The assembly machine necessitates a shifting mechanism extensible in a direction perpendicular to a plate surface of the photo film support plate 113. The assembly machine must be large and cannot have a moderate size.

Figure 12:
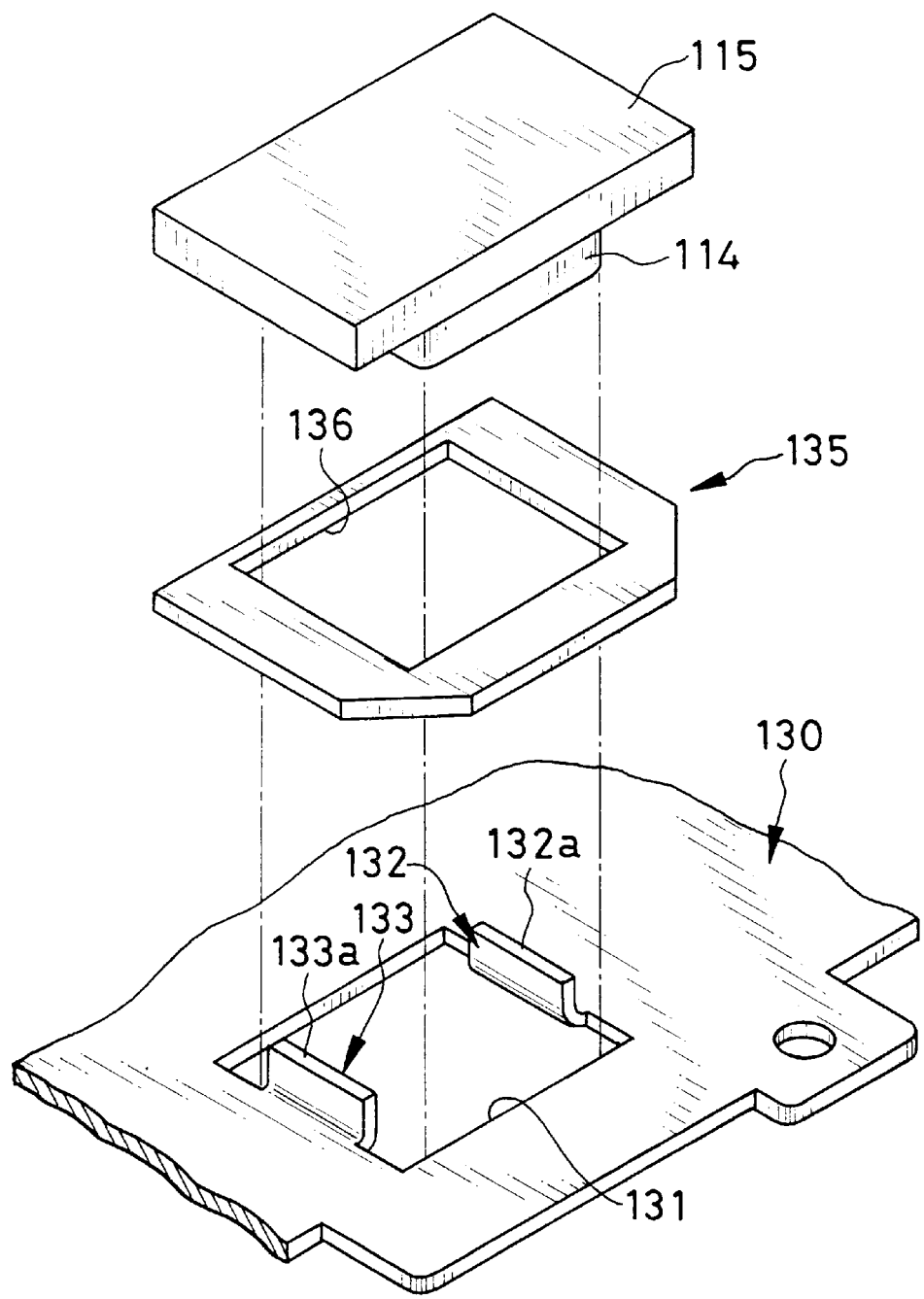
FIG. 12 is an exploded perspective illustrating a preferred photo film support device having a pair of head support ridges.
Figure 13:
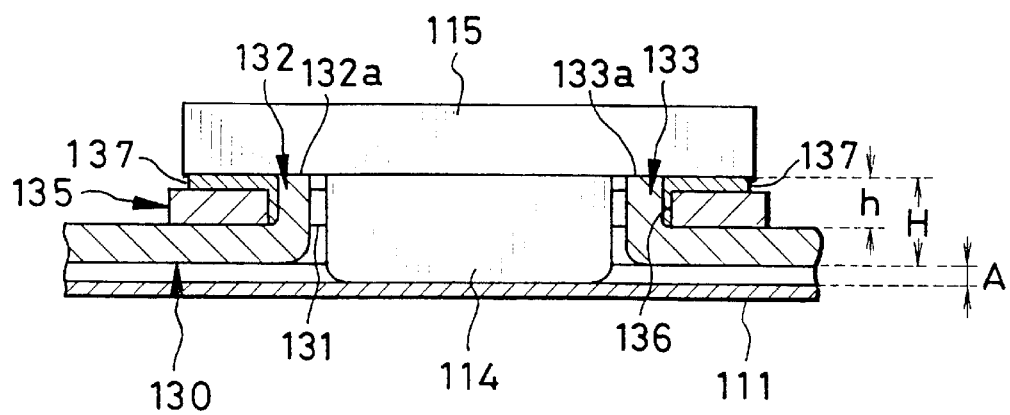
FIG. 13 is a cross section illustrating a secured state of the magnetic head.

In FIGS. 12 and 13, the preferred method of securing a magnetic head to solve the above-mentioned problem is illustrated. Elements similar to those of FIG. 11 are designated with identical reference numerals.

In FIGS. 12 and 13, a photo film support plate 130 or pressure plate has an opening 131. Edges of the opening 131 have first and second head support ridges 132 and 133 or projections, which project rearwards from the photo film support plate 130. The head support ridges 132 and 133 are opposite to each other inside the photo film support plate 130. The magnetic head 114 is held on the front face of the head base plate 115, and positioned by keeping the head base plate 115 in contact with end faces 132a and 133a of the head support ridges 132 and 133, to project from the opening 131 slightly toward the photo film 111.

The projecting amount A by which the magnetic head 114 projects from the opening 131 is set in consideration of suitable pressure applied by the magnetic head 114 to the magnetic recording area 58c (See FIG. 8). When the magnetic head 114 is set at the projecting amount A, a height of the head support ridges 132 and 133 as measured from the front face of the photo film support plate 130 is set equal to a predetermined height H so as to cause the end faces 132a and 133a to contact the front face of the head base plate 115. As the head support ridges 132 and 133 are positioned according to the height measured from the photo film support plate 130, a distance between an advancing point of the magnetic head 114 and a supporting position of the head base plate 115 is kept constant without being influenced by errors in the thickness of the photo film support plate 130. The projecting amount of the magnetic head 114 can be adjusted safely with high precision.

A spacer 135 is inserted in a gap between the photo film support plate 130 and the head base plate 115. The spacer 135 is made by use of a metal plate having a thickness smaller than a height h, by which the head support ridges 132 and 133 is erected with reference to the rear face of the photo film support plate 130. A rectangular cutout 136 is formed in the center of the spacer 135, to uncover the opening 131 in the photo film support plate 130 and the head support ridges 132 and 133. The spacer 135 is positioned by insertion of the head support ridges 132 and 133 in the cutout 136. Adhesive agent 137 is filled in gaps between the spacer 135 and the head base plate 115 and between the spacer 135 and the head support ridges 132 and 133, and hardened.

Figure 14:
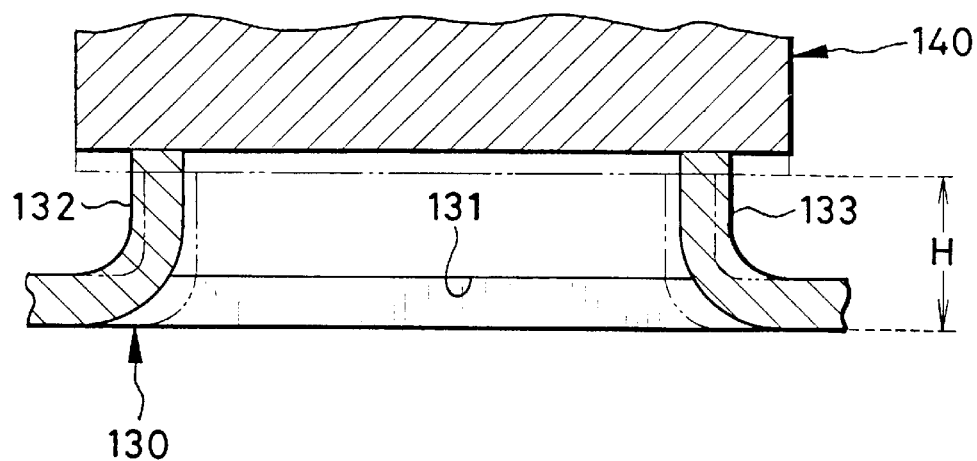
FIG. 14 is an explanatory view in section, illustrating a process of adjusting a height of the head support ridges.

In the course of the production of the photo film support plate 130, at first a metal plate material is subjected to punching, to form the opening 131 with portions for the head support ridges 132 and 133. Then the head support ridges 132 and 133 are erected toward the rear from the opening 131, to obtain the photo film support plate 130 finally. Note that it is preferable to erect the head support ridges 132 and 133 initially by a height slightly greater than the predetermined height H as viewed from the front of the photo film support plate 130. After this, a punch 140 in FIG. 14 is pressed against the end faces 132a and 133a of the head support ridges 132 and 133 while the photo film support plate 130 is laid horizontally. The punch 140 vertically collapses the head support ridges 132 and 133 to shape the head support ridges 132 and 133 at the predetermined height H with high precision. It is necessary initially to form the opening 131 at a sufficiently great size because the head support ridges 132 and 133 are collapsed in directions to reduce the size of the opening 131.

To secure the magnetic head 114 to the photo film support plate 130, at first the photo film support plate 130 is laid by directing the head support ridges 132 and 133 upwards. Then the spacer 135 is placed on the photo film support plate 130 while the head support ridges 132 and 133 are received in the cutout 136.

Additional adhesive agent for provisional use is applied to the end faces 132a and 133a of the head support ridges 132 and 133 in the cutout 136. Then the head base plate 115 with the magnetic head 114 is placed on the head support ridges 132 and 133. The head base plate 115 is positioned while contacted with the end faces 132a and 133a. As the head support ridges 132 and 133 have been finely shaped at the predetermined height H, the contact of the head base plate 115 with the end faces 132a and 133a can reliably cause the magnetic head 114 to project by the predetermined amount A from the opening 131. It is possible to position the magnetic head more easily and more exactly than the prior art in which the projecting amount is adjusted by shifting the magnetic head in an extremely fine manner.

The additional adhesive agent is used to coat the end faces 132a and 133a, and causes the head support ridges 132 and 133 to be provisionally attached to the head base plate 115. It is to be noted that any suitable type of the additional adhesive agent may be applied for this provisional use. For example, commercially available instantaneous adhesive agent can be used.

Then the adhesive agent 137 is introduced in the gaps between the space 135, the head base plate 115 and the head support ridges 132 and 133, to keep the spacer 135 in tight contact with the photo film support plate 130. The magnetic head 114 is kept so positioned as to contact the magnetic recording area 58c (See FIG. 8) of the photo film 111. As the head base plate 115 is provisionally attached to the end faces 132a and 133a of the head support ridges 132 and 133, the head base plate 115 or the spacer 135 does not drop from the photo film support plate 130 during the introduction of the adhesive agent 137, but can be easily handled together. Furthermore the adhesive agent 137 when introduced between the head base plate 115 and the spacer 135 does not raise the head base plate 115 or does not change the projecting amount of the magnetic head 114. Note that a preferable example of the adhesive agent 137 is an ultraviolet cure type which has a characteristic which is ordinarily fluid and hardened in response to application of ultraviolet rays.

In the above embodiment, the metal plate is used for producing the photo film support plate. But the photo film support plate may be made from resin. The head support ridges can be formed integrally with the resin support plate, so that the number of steps in the process of manufacturing the photo film support plate can be reduced.

In the above embodiment, the spacer 135 is a metal plate. Of course the spacer 135 can be formed from any suitable material, such as resin. In the above embodiment, the spacer 135 is a single part. Alternatively plural plates as spacers may be arranged for the purpose of reducing the gap between the photo film support plate 130 and the head base plate 115. Furthermore the spacer 135 can be attached to the rear face of the photo film support plate 130. This is typically effective in the use of the plural combined spacers as the spacers are prevented from dropping down from the photo film support plate 130 or prevented from being offset. It is still easier to apply and introduce the adhesive agent.

In the above embodiment, the one pair of the head support ridges 132 and 133 are disposed. Of course two or more pairs of head support ridges may be disposed on the edge of the opening 131.

Figure 15:
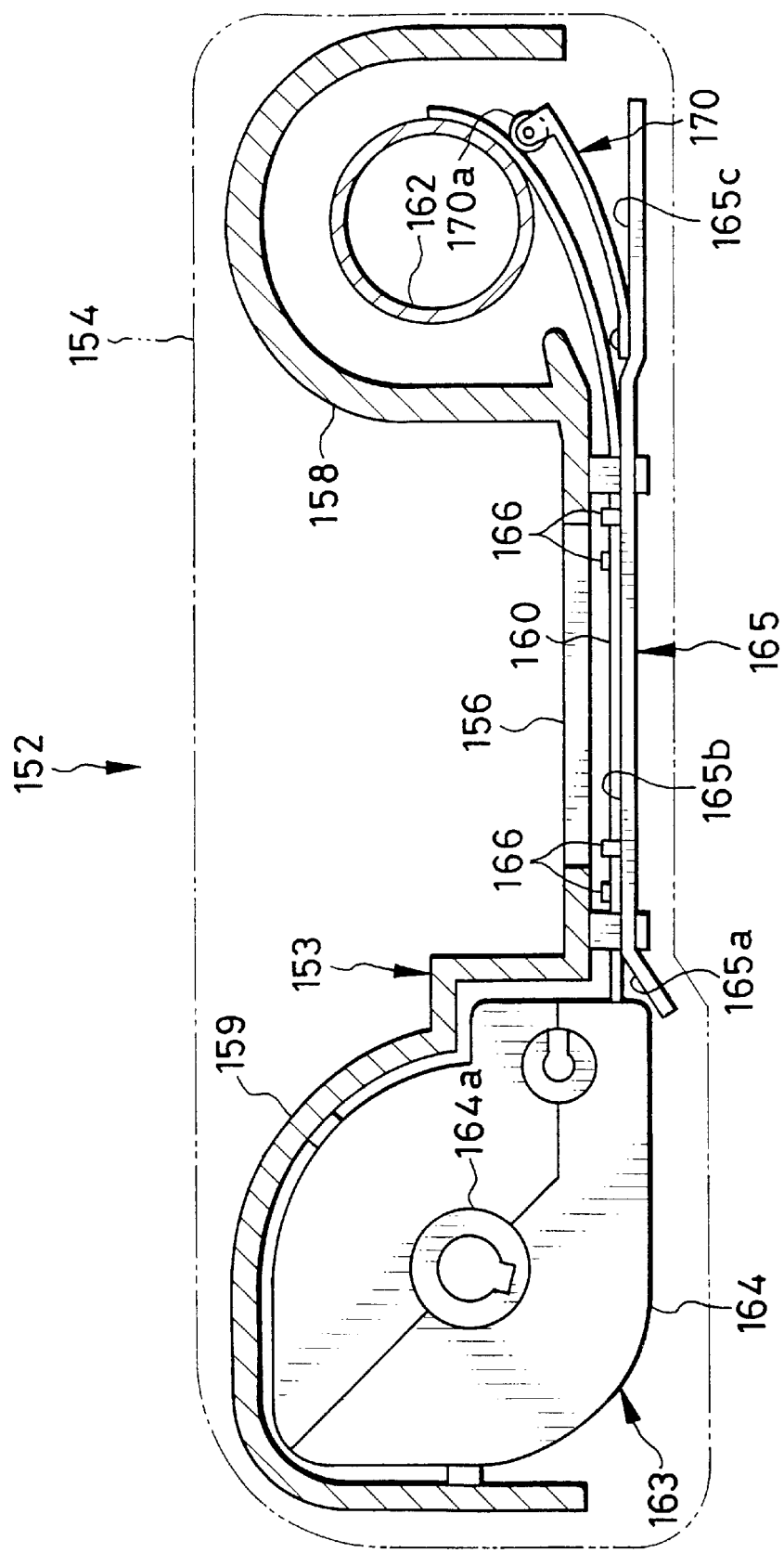
FIG. 15 is an explanatory view in section, illustrating a camera having an additional preferred photo film support plate.
Figure 16:
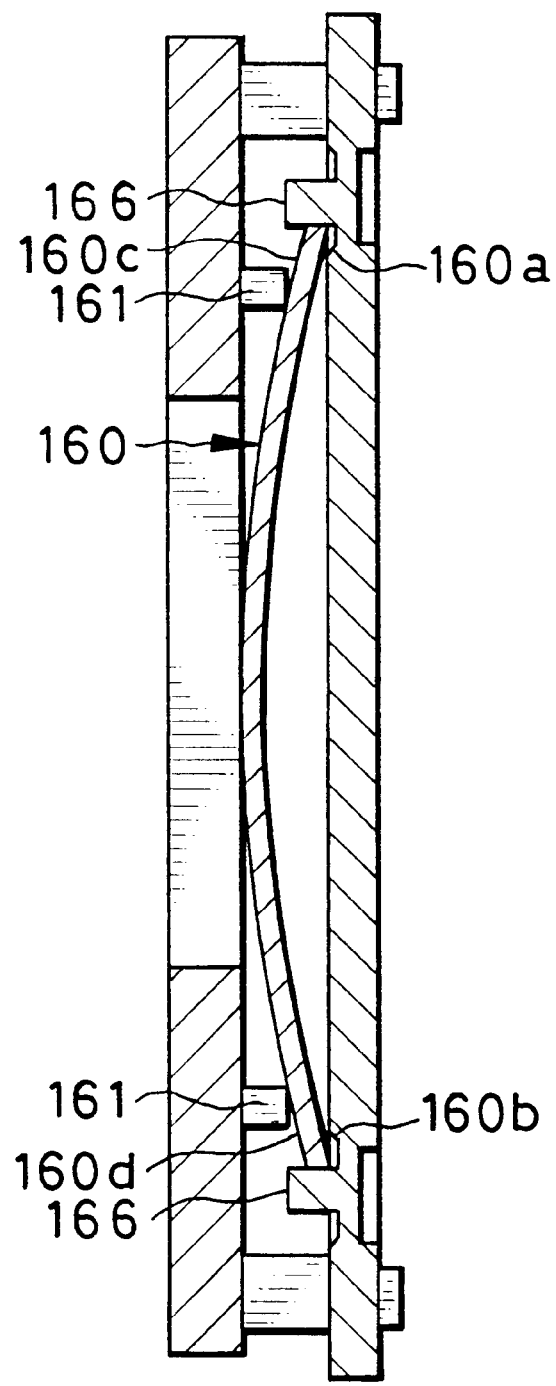
FIG. 16 is a cross section illustrating the photo film support plate and its relevant structures with photo film.

Referring now to FIGS. 15 and 16, a method of efficiently producing a photo film support plate of metal is described now. A camera 152, in which the photo film support plate is used, is constituted by a camera body 153 and an outer casing 154. The camera body 153 incorporates a mechanism for taking an exposure, a dry battery as power source, a photo film advance mechanism and the like. The outer casing 154 covers the entirety of the camera body 153. In the rear of the camera body 153, a pair of guide rails 161 are arranged between a photo film roll chamber 158 and a cassette holder chamber 159 in parallel with each other at an interval smaller than a width of photo film 160. A reference numeral 156 designates an exposure aperture. A photo film cassette 163 has such elements as a cassette shell 164 and a spool 164a.

A photo film support plate 165 or pressure plate is secured to the rear of the camera body 153 by screws, and supports the rear of the photo film 160.

A front face 165b of the photo film support plate 165 is provided with four metal pins 166, which include upper two and lower two, have a cylindrical shape, and protrude to the rear from the camera body 153. The metal pins 166 have a diameter d of 1.2 mm, and a projecting amount e of 0.8 mm. See FIG. 17C.

The metal pins 166 respectively regulate lateral edges 160a and 160b of the photo film 160 moved to the front face 165b, to position the photo film 160 with reference to the vertical direction. Edge portions 160c and 160d of the photo film 160 are caused to run along the guide rails 161 toward the photo film roll chamber 158 by setting the photo film 160 on the guide rails 161.

A stepped portion 165c is formed by bending the photo film support plate 165 in the vicinity of the photo film roll chamber 158 toward the rear. The stepped portion 165c has a level offset from a photo film support portion to the rear. A photo film guide plate 170 is secured to the stepped portion 165c by screws. The shape of the stepped portion 165c prevents the advance of the photo film 160 from being blocked by the screws securing portions of the photo film guide plate 170. The photo film 160 is guided by the photo film guide plate 170 into the photo film roll chamber 158. A roller 170a is disposed at an edge of the photo film guide plate 170, and pushes the photo film 160 to a surface of a take-up spool 162, which winds the photo film 160 in a roll form.

The metal pins 166 are formed with the photo film support plate 165 by subjecting a support portion of the photo film support plate 165 to a technique of drawing press at the time of the press of the photo film support plate 165, the operation of the press forming an inclined portion 165a and the stepped portion 165c. After the press, the photo film guide plate 170 is secured by use of screws.

Figure 17A:
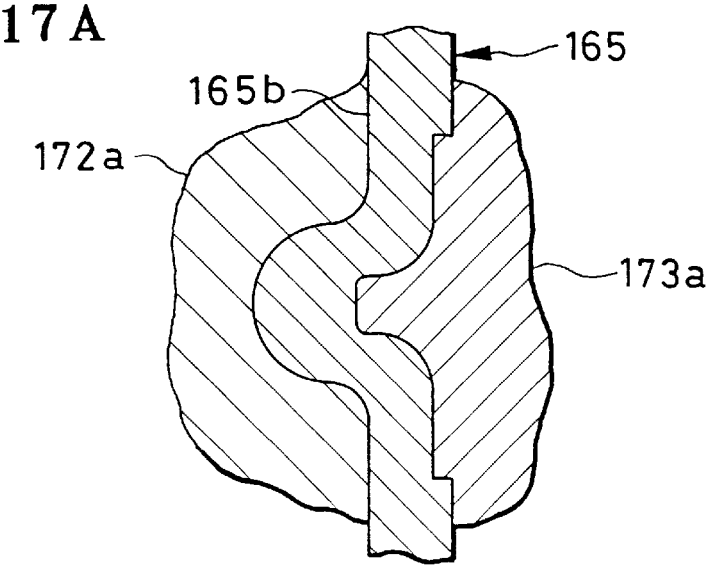
FIG. 17A is a cross section, partially broken, illustrating a first drawing die set for forming each metal pin.
Figure 17B:
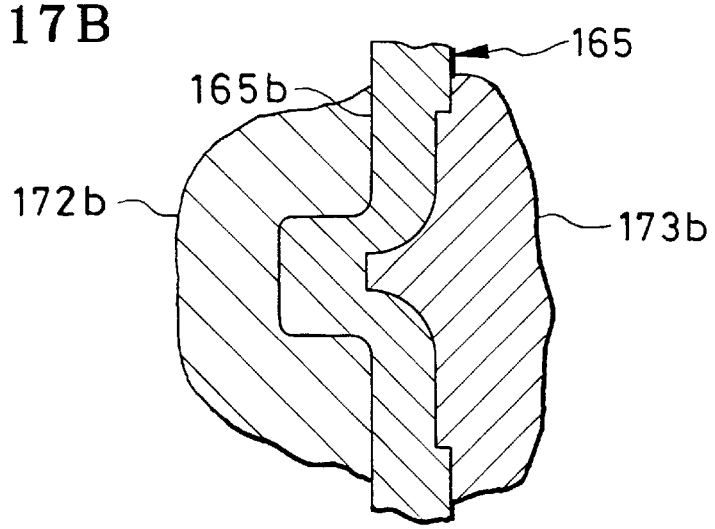
FIGS. 17B and 17C are cross sections, partially broken, illustrating a second and a third drawing die sets for forming each metal pin.
Figure 17C:
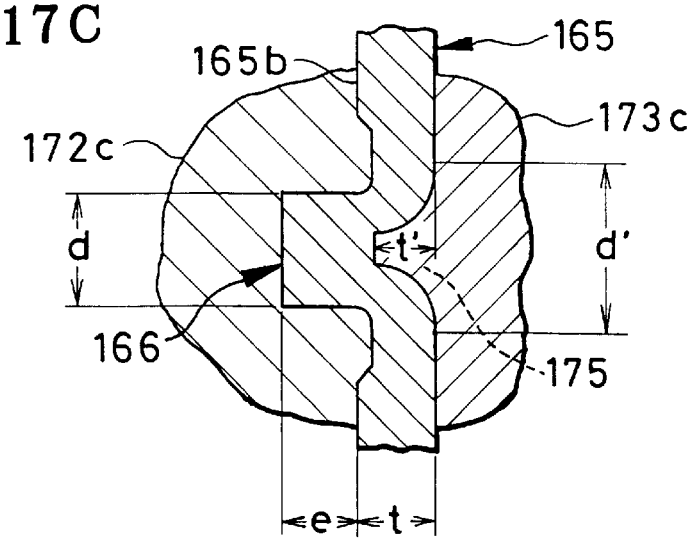
Figure 18:
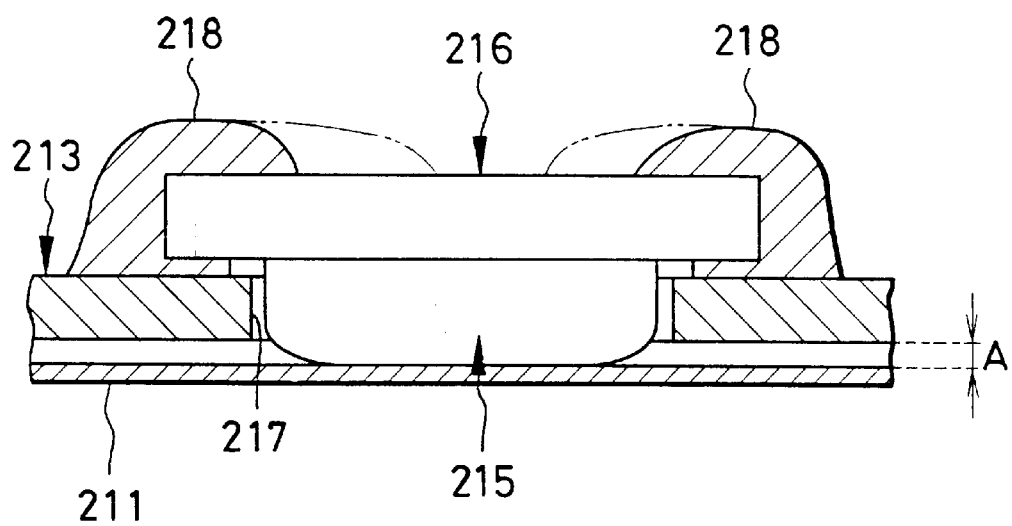
FIG. 18 is a cross section illustrating a secured state of a magnetic head in a photo film support device according to the prior art.

In FIGS. 17A–17C, elements of a device for the drawing press in a press apparatus are illustrated. In the course of the press of the photo film support plate 165, portions to be formed into the metal pins 166 are pressed by a drawing die set as a combination of a die 172a and a punch 173a, by a combination of a die 172b and a punch 173b, and then by a combination of a die 172c and a punch 173c. A circular recess 175 is created by the drawing press in a position reverse to each of the metal pins 166 on the front face 165b. The metal pins 166 are formed with the diameter d which is approximately equal to the thickness t of the photo film support plate 165. Note that the circular recess 175 has a depth t' in a range from (½)t to (⅓)t, and has an inner diameter d' which is greater than the thickness t of the photo film support plate 165.

This being so, the drawing press is effected at the time of the press of the photo film support plate 165 so as to form the metal pins 166 in the predetermined positions on the front face 165b. Thus no caulking of the prior art structure is required. There occurs no offsetting in the positions due to the caulking. The number of steps in the manufacturing process and the number of relevant parts can be reduced. Also the diameter d of the metal pins 166 may be set greater than that of pins according to the prior art, to smooth the advance of the photo film 160.

Note that the circular recess 175 is formed in the above manufacturing method. Of course it is possible to use a type of drawing press according to which the circular recess 175 is not created.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A magnetic head securing method for a camera, said camera including a photo film support plate for supporting a back of photo film, said photo film having a magnetic recording area, an opening formed in said photo film support plate, and a magnetic head, disposed to project forwards from inside said opening, for recording information to and/or reading information from said magnetic recording area, said magnetic head securing method comprising steps of:

using a head base plate, mounted on a rear face of said photo film support plate to cover said opening, for supporting said magnetic head, said head base plate having at least one recess or at least one projection disposed on a periphery thereof and/or on a rear face thereof in a vicinity of said periphery; and applying adhesive agent to at least one portion of said periphery of said head base plate, said adhesive agent being disposed to extend from a front face of said head base plate to a surface of said recess or said projection, said adhesive agent having a contact area in contact with said head base plate, said contact area being enlarged by said recess or said projection, said adhesive agent being hardened for securing said head base plate to said photo film support plate.

2. A magnetic head securing method as defined in claim 1, wherein said at least one portion of said periphery of said head base plate includes first and second edges opposite to each other, and said at least one recess or said at least one projection is located on said first and second edges.

3. A magnetic head securing method as defined in claim 2, wherein said at least one recess is first and second recesses, formed in said head base plate by cutting a rear end of said first and second edges.

4. A magnetic head securing method as defined in claim 3, wherein said head base plate further has first and second projection trains, respectively including plural projections, disposed on an inside of said first and second recesses to project toward said periphery.

5. A magnetic head securing method as defined in claim 2, wherein said at least one projection is first and second projection trains, respectively including plural projections, disposed on said first and second edges to project from said head base plate in a peripheral direction.

6. A magnetic head securing method for a camera, said camera including a photo film support plate for supporting a back of photo film, said photo film having a magnetic recording area, an opening formed in said photo film support plate, and a magnetic head, disposed to project forwards from inside said opening, for recording information to and/or reading information from said magnetic recording area, said magnetic head securing method comprising steps of:

disposing at least first and second head support projections in at least first and second positions defined in said opening opposite to each other, said first and second head support projections projecting from said opening rearwards by a predetermined height;

mounting at least one spacer behind said photo film support plate and outside said first and second head support projections, said spacer having a predetermined thickness smaller than said predetermined height;

after mounting said spacer, mounting a head base plate on said photo film support plate in contact with said first and second head support projections, said head base plate covering said opening and supporting said magnetic head; and pouring and hardening adhesive agent between said head base plate and said spacer.

7. A magnetic head securing method as defined in claim 6, wherein said adhesive agent is poured after said spacer is mounted on said photo film support plate and while said head base plate contacts said first and second head support projections.

8. A magnetic head securing method as defined in claim 7, wherein said spacer is a spacer plate, and said spacer plate further has a substantially rectangular cutout, overlaid on said opening, for receiving said first and second head support projections to fit said spacer plate on said photo film support plate.

9. A magnetic head securing method as defined in claim 7, further comprising a step of, after mounting said spacer on said photo film support plate, provisionally attaching said head base plate to said first and second head support projections, before pouring said adhesive agent.

10. A magnetic head securing method as defined in claim 6, wherein said photo film support plate is a metal plate; and further comprising steps of:

initially forming first and second projecting portions in said first and second positions of said opening;

bending said first and second projecting portions rearwards, said first and second projecting portions having a predetermined initial height as measured in a rearward direction, and said predetermined initial height being greater than said predetermined height; and depressing said first and second projecting portions in a forward direction to form said first and second head support projections at said predetermined height.

11. A photo film support device, incorporated in a camera, for supporting a back of photo film, said photo film having a magnetic recording area, said photo film support device comprising:

a photo film support plate;

an opening formed in said photo film support plate;

a magnetic head, disposed to project forwards from inside said opening, for recording information to and/or reading information from said magnetic recording area;

a head base plate, mounted on a rear face of said photo film support plate to cover said opening, for supporting said magnetic head;

adhesive agent, applied to at least one portion of said periphery of said head base plate, and hardened for securing said head base plate to said photo film support plate; and at least one recess or at least one projection disposed on a periphery of said head base plate and/or on a rear face of said head base plate in a vicinity of said periphery, said adhesive agent being disposed to extend from a front face of said head base plate to a surface of said recess or said projection, said recess or said projection enlarging a contact area between said adhesive agent and said head base plate.

12. A photo film support device as defined in claim 11, wherein said at least one portion of said periphery of said head base plate includes first and second edges opposite to each other, and said at least one recess or said at least one projection is located on said first and second edges.

13. A photo film support device as defined in claim 12, wherein said at least one recess is first and second recesses, formed in said head base plate by cutting a rear end of said first and second edges.

14. A photo film support device as defined in claim 13, wherein said head base plate further has first and second projection trains, respectively including plural projections, disposed on an inside of said first and second recesses to project toward said periphery.

15. A photo film support device as defined in claim 12, wherein said at least one projection is first and second projection trains, respectively including plural projections, disposed on said first and second edges to project from said head base plate in a peripheral direction.

16. A photo film support device, incorporated in a camera, for supporting a back of photo film, said photo film having a magnetic recording area, said photo film support device comprising:

- a photo film support plate; an opening formed in said photo film support plate;
- a magnetic head, disposed to project forwards from inside said opening, for recording information to and/or reading information from said magnetic recording area;
- at least first and second head support projections, disposed in at least first and second positions defined in said opening opposite to each other, said first and second head support projections projecting from said opening rearwards by a predetermined height;
- a head base plate, mounted on a rear face of said photo film support plate, contacted by said first and second head support projections to cover said opening, for supporting said magnetic head;
- at least one spacer, mounted between said photo film support plate and said head base plate and outside said first and second head support projections before said head base plate is mounted on said photo film support plate, said spacer having a predetermined thickness smaller than said predetermined height; and
- adhesive agent poured and hardened between said head base plate and said spacer.

17. A photo film support device as defined in claim 16, wherein said adhesive agent is poured after said spacer is mounted on said photo film support plate and while said head base plate contacts said first and second head support projections.

18. A photo film support device as defined in claim 16, wherein said photo film support plate is a metal plate, initially first and second projecting portions are formed in said first and second positions of said opening, then said first and second projecting portions are bent rearwards, said first and second projecting portions having a predetermined initial height as measured in a rearward direction, and said predetermined initial height being greater than said predetermined height, and then said first and second projecting portions are depressed in a forward direction to form said first and second head support projections at said predetermined height.

* * * * *